United States Patent [19]

Rieger

[11] Patent Number: 4,473,001

[45] Date of Patent: Sep. 25, 1984

[54] METHOD AND APPARATUS FOR AGITATING THE CONTENTS OF A FERMENTATION TANK

[76] Inventor: Herbert Rieger, Talstrasse 33, D 7121 Ingersheim, Fed. Rep. of Germany

[21] Appl. No.: 407,750

[22] Filed: Aug. 13, 1982

[30] Foreign Application Priority Data

Aug. 21, 1981 [DE] Fed. Rep. of Germany ....... 3133045

[51] Int. Cl.³ .......................... B01F 15/02; C12G 1/02
[52] U.S. Cl. .................................. 99/277.2; 366/196; 366/278; 426/231; 426/519; 435/305
[58] Field of Search .............. 99/277.2; 366/276, 277, 366/278, 186; 426/519, 231; 435/305; 366/194, 195, 196

[56] References Cited

U.S. PATENT DOCUMENTS

| | | | |
|---|---|---|---|
| 3,164,379 | 1/1965 | Lindell | 366/276 |
| 3,368,723 | 2/1968 | Hardeman | 366/276 |
| 3,407,872 | 10/1968 | Crane | 366/276 |

FOREIGN PATENT DOCUMENTS

| | | |
|---|---|---|
| 902606 | 7/1948 | Fed. Rep. of Germany . |
| 1021864 | 1/1958 | Fed. Rep. of Germany . |
| 1075418 | 2/1960 | Fed. Rep. of Germany . |
| 2509960 | 9/1976 | Fed. Rep. of Germany . |
| 1568080 | 5/1980 | United Kingdom . |

Primary Examiner—Robert W. Jenkins
Attorney, Agent, or Firm—Mason, Kolehmainen, Rathburn & Wyss

[57] ABSTRACT

The present invention relates to a method for agitating the contents of a large tank containing a liquid and solid matter, in particular to a fermentation tank for grape mash comprising a motor-driven agitator. The essence of the invention is that the agitator when switched on first carries out an oscillating motion and thus loosens up the solid matter, in particular the rape.

3 Claims, 4 Drawing Figures

METHOD AND APPARATUS FOR AGITATING THE CONTENTS OF A FERMENTATION TANK

The present invention relates to a method for agitating the contents of a fermentation tank for grape mash, which is equipped with a rotating motor-driven agitatior and an outlet device for the juice.

The fermentation of grape mash in large tanks presents the problem that, when there is no agitation, the rape will settle on the juice surface to form a very hard-to-penetrate layer. This rape cake is very solid and also of a significant thickness. For starting the stirring operation, considerable force is required to separate this rape cake in order to enable the agitator to homogeneously mix the rape with the juice. The construction of the agitator must therefore be far more rugged than it would be necessary if the rape were uniformly distributed in the juice.

A similar problem is encountered after the juice has been drained from the large tank and the rape accumulates in the lower section of the tank, from where it is to be discharged through an opening in the tank front side. In German patent application No. 31 01 510.7 it has already been proposed to arrange a worm shaft at the bottom of fermentation tanks for the purpose of conveying the rape to the respective tank discharge opening. Particularly, when juice has been extracted from the rape as far as possible, the worm shaft will be able to discharge the rape in its immediate vicinity but will gradually rotate empty so that a hollow space will be formed in this area, because the above lying rape is so heavily compacted that it can no longer fall down into this hollow space. It must then be attempted manually to push the rape into the area of the worm shaft by introducing a bar from above. In the case of an arrangement in accordance with the above German laid open patent application, however, the agitator would have to be switched off during this time because the agitator wings would be stuck in the rape cake so that agitator and wings were damaged unless they are dimensioned to be several time stronger than would be necessary for an agitator which is intended to merely ensure homogeneous mixing of rape and juice.

It is the object of the invention to develop a method by which it is prevented that excessive torques affect the agitator and the agitator drive.

According to the invention, this problem is solved in that the agitator when switched on, first carries out an oscillating motion. Due to the continuously changing direction of movement of the agitator, the rape in the immediate vicinity of the agitator wings will first be loosened up. This loosening-up also affects neighbouring areas until all the rape can fall down into the area of the worm shaft or until the agitator can fully rotate in the desired sense of rotation.

In many cases, an oscillating motion with constant amplitude will be sufficient to cause falling down of the rape into the hollow space below. In an embodiment of the method in accordance with the invention the amplitude of the oscillation, however, is increasing in the course of the oscillating motion.

This is advantageous in that at first, i.e. at a small amplitude, the rape in the immediate vicinity of the agitator wings is loosened up, and in that, with an increasing amplitude, the areas affected by loosening-up become increasingly larger until the agitator can rotate fully or perform a uniform oscillation as has been intended from the outset.

This embodiment is not only suitable in that the rape is brought into a hollow space below but also advantageous in cases where the rape has to be loosened up in a tank without below-situated hollow space, i.e. in a fermentation tank which does not comprise a worm shaft generating a hollow space but where the rape, due to the inclined location of the tank bottom and the action of the agitator, falls out of the discharge opening, e.g. in the case of upright tanks.

The present invention further relates to an apparatus for carrying out this method, comprising a motor drive for the agitator and a reversing mechanism to change the direction of rotation of the agitator. The essence of the invention is that the oscillation amplitude is controlled by the resistance of the tank contents acting on the agitator.

This is advantageous in that any overloading of the agitator and its drive is excluded. The agitator wing always penetrates the still not loosened up solid material or the rape layer, respectively, until the increasingly dense rape before the agitator wing exerts a resistance high enough to cause reversing of the drive. When the agitator wing returns, the compacted portion of the rape returns resilienty into the hollow space left by the wing and falls downward, so that upon the next reversal of the direction of rotation of the agitator shaft, the wing must exert its max. torque only after a larger angle of rotation.

The reversing mechanism can be controlled in the most different manner via the resistance of the material to be agitated counteracting the agitator. In one embodiment of the invention where the agitator is driven by an electric motor, this reversing mechanism can be controlled by the power consumption of the electric motor. Upon reaching a certain value of the power consumption of the electric motor, the direction of rotation of the agitator is changed. In the case of this very simple device it must only be ensured that the starting current of the motor does not activate the reversing mechanism. The reversing mechanism can, for example, also be controlled via a friction clutch whose halves counterrotate relative to each other if a certain value of the transmitted torque is exceeded thus releasing a control command to reverse the direction of rotation of the agitator.

In another embodiment of the invention the duration of the oscillating motion can be adjusted independent of the resistance of the material to be mixed, for example by setting the time by means of a time switch, so that after run-down of the selected time period, the drive is switched from the oscillating motion to the rotating motion of the agitator.

The method in accordance with the invention and the apparatuses in accordance with the invention are suitable not only for fermentation tanks which contain a liquid material as well as solid material which tends to conglomerate.

The drawing shows an embodiment of a horizontally arranged large tank which realizes the invention. Those parts that are essential for understanding the invention are shown only schematically.

Figure 1:
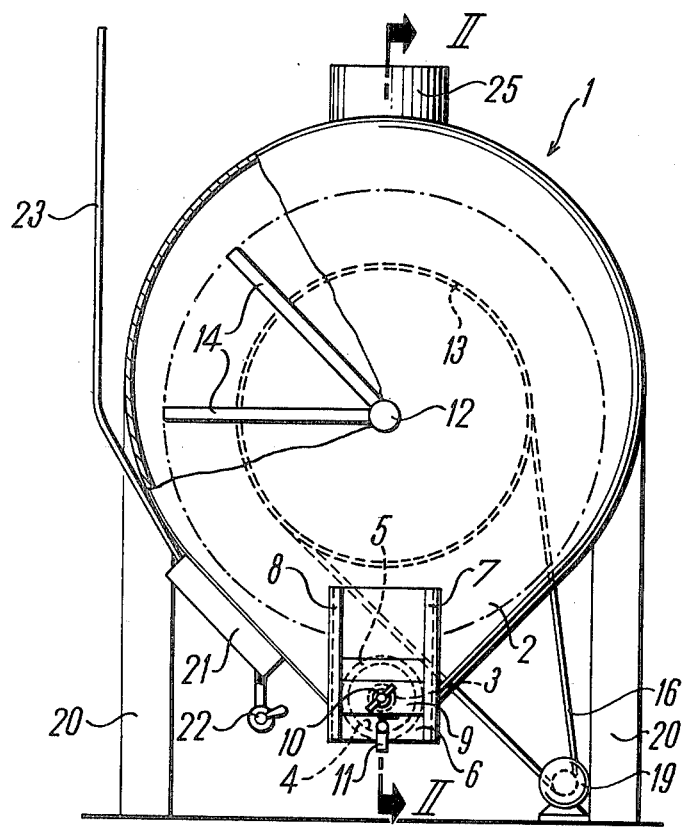
FIG. 1 shows an embodiment of a horizontally arranged fermentation tank as a partially cut-away view in accordance with the invention.
Figure 2:
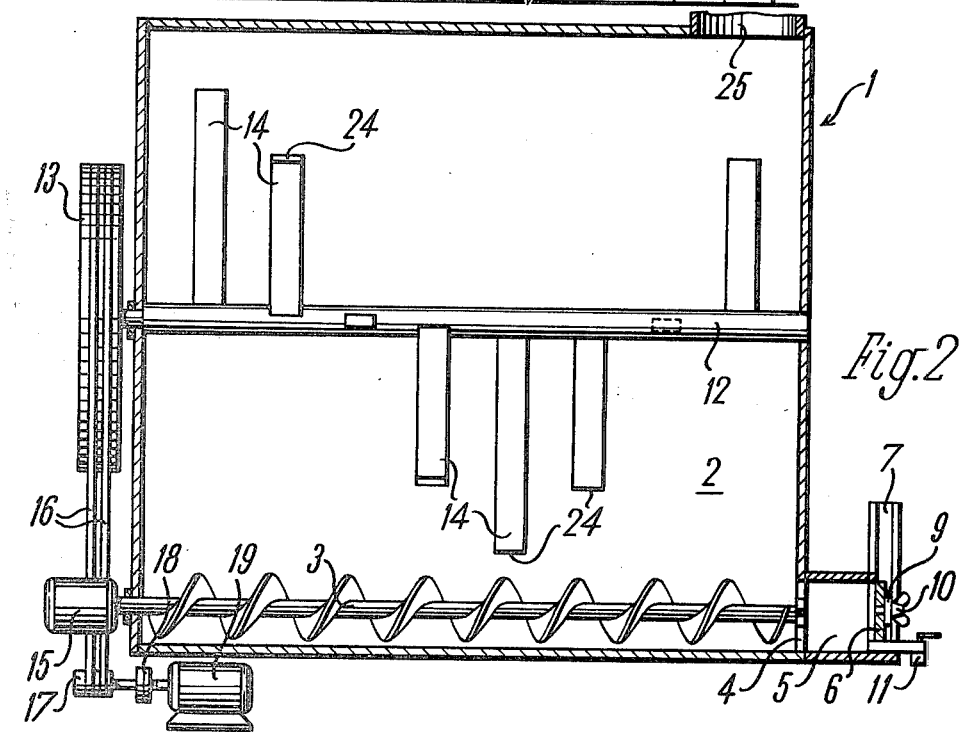
FIG. 2 is a section along line II—II in FIG. 1.

The horizontally arranged large tank shown in the drawing comprises an essentially cylindrical portion 1, which in its lower section blends into a portion 2 with a Vee-shaped cross section. At the lowest point of the Vee-shaped portion a conveyor worm 3 is arranged, shown in broken lines in FIG. 1, which is used to discharge the rape through an opening 4 with a short welded-on fitting 5 in the bottom of the tank. The front end of fitting 5 can be closed by means of cap 6 which is guided in two rails 7 and 8 of U-shaped cross section together with a reinforcing strip 9 so as to be adjustable in height and which can be forced against the opening of fitting 5 by means of a clamping means shown as a thumb screw 10 in the illustrated embodiment of the invention. Cap 6 is provided with a juice outlet line 11 which can be shut-off by means of a cock.

Approximately coinciding with the axis of cylindrical portion 1, an agitator shaft 12 is rotatably supported, which on its rear end extending beyond the tank carries a driven wheel 13 or a gear unit. Agitator wings 14 of rectangular shape are fixed to shaft 12 and arranged along shaft 12 offset relative to each other by a certain angle, for example 45°. Worm shaft 3 is driven by a motor 15. Driven wheel 13 is connected via transmission belts 16 or chains with a driving wheel 17 or chain wheel driven via a friction clutch 18 by an electric motor 19. If the torque transmitted by friction clutch 18 exceeds a certain value, the two halves of the friction clutch will counterrotate relative to each other. At a relative rotation of the two clutch halves a control command is released via known means to switch off motor 19 and on again to rotate in the opposite direction of rotation.

The tank rests in a bearing structure on the floor, of which only supporting columns 20 are shown in the drawing. When used as a fermentation tank for grape mash, the tank is provided with juice chambers 21 welded to the outer wall of the Vee-shaped portion, which in their lowest point have a juice outlet 22 and in their uppermost point an air vent 23.

The tank is filled with grape mash through filler hole 25, which is mixed during fermentation by agitator 12, 14 rotating at low speed. At a certain stage of the fermentation process, the rape tends to emerge to the surface. If the agitator is then switched off for any reason, the rape conglomerates on the juice surface to form a solid rape cake which is hard to penetrate. If motor 19 is switched on, agitator wings 14 will not have enough force to separate the rape cake. Agitator shaft 12 will therefore only rotate through a small angle of rotation, after which the torque required for further rotation of shaft 12 is higher than the torque transmitted by friction clutch 18, causing the clutch halves to counterrotate relative to each other and to reverse the direction of rotation of motor 19. Shaft 12 rotates in the opposite direction, with agitator wings 14 first returning along the path they have left in the previous rotation, and then a distance further in the same direction into the first resilient rape cake until the torque is so high that the direction of rotation of motor 19 is reversed. Consequently, shaft 12 carries out oscillating movements until the rape cake is fully penetrated and the resistance to be overcome by agitator wings 14 is smaller than the maximum torque transmitted from friction clutch 18. From now on, the agitator will continuously rotate in the same direction of rotation unless a special programme causes reversing of the direction of rotation of the agitator after preselected time intervals.

The same process takes place when the juice accumulated in juice chambers 21, separated from the tank inner space by sieves is drained via juice outlet 22. The juice will remain in the lowest portion of the tank which is below a horizontal plane defined by the mouth of juice outlet 22 in juice chamber 21. With cap 6 pushed downwards, i.e. with opening 4 uncapped, worm shaft 3 conveys the rape in the area of worm shaft 3 being loosened up by the remaining juice through opening 4 of the tank. If, however, the rape remains in the tank for an extended period of time after the juice has been drained through outlet 22, the rape will conglomerate to form a very tough substance so that after discharge of the rape loosened up by the still remaining juice in the area of worm shaft 3, a hollow space will remain in the area of worm shaft 3, into which the above lying rape generally cannot fall down because it is too dense.

If agitator 12, 14 is switched on, the agitator wings will again carry out a relatively small rotating movement, which is probably only determined by the resilience of the rape compacted by agitator wings 14. If the direction of rotation of motor 19 is reversed because the maximum torque transmitted by friction clutch 18 is exceeded, agitator wings 14 move in the opposite direction. This reciprocating motion loosens up the rape to such a degree that it falls down into the hollow space below generated by worm shaft 3, is caught by worm shaft 3 and discharged from the tank.

The agitator drive, e.g. a braking motor, can be controlled in such a manner that it is always switched off if one of agitator wings 14 is in a vertical position because the distance from wing tip 24 to the hollow space generated by worm shaft 3 will then be at its minimum, and the rape loosened up by said wing tip 24 will first fall into the hollow space, which will affect the neighbouring rape so as to also fall downward. Switching off the agitator in a position where one of the agitator wings is in a vertically downward position is the more important the fewer angularly offset agitator wings 14 are arranged along agitator shaft 12.

The subject in accordance with the invention is equally suitable for agitators in other tanks, e.g. upright tanks with conical bottoms if, for example, the agitator is arranged in the conical bottom. The tanks in accordance with the invention can also be employed advantageously in the juice or alcohol manufacture by fermentation or in breweries.

Moreover, the subject in accordance with the invention is not only suited for separating and thoroughly mixing a rape cake floating on the juice surface, but also, for example, for agitators in upright tanks, where the agitator rotates about a vertical axis and therefore would be counteracted during start-up by an excessive resistance, which is reduced by the oscillating motion, e.g. during the discharge of white grape mash or red grape mash containing a high percentage of solid matter.

Figure 3:
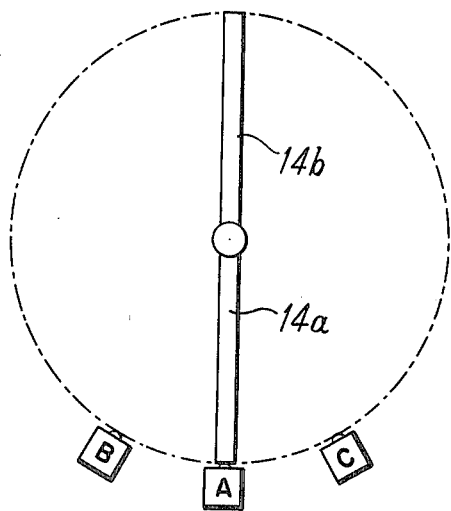
FIG. 3 is a diagrammatic view of an alternative embodiment of the invention showing the arrangement of limit switches to affect oscillatory motion of the agitator.
Figure 4:
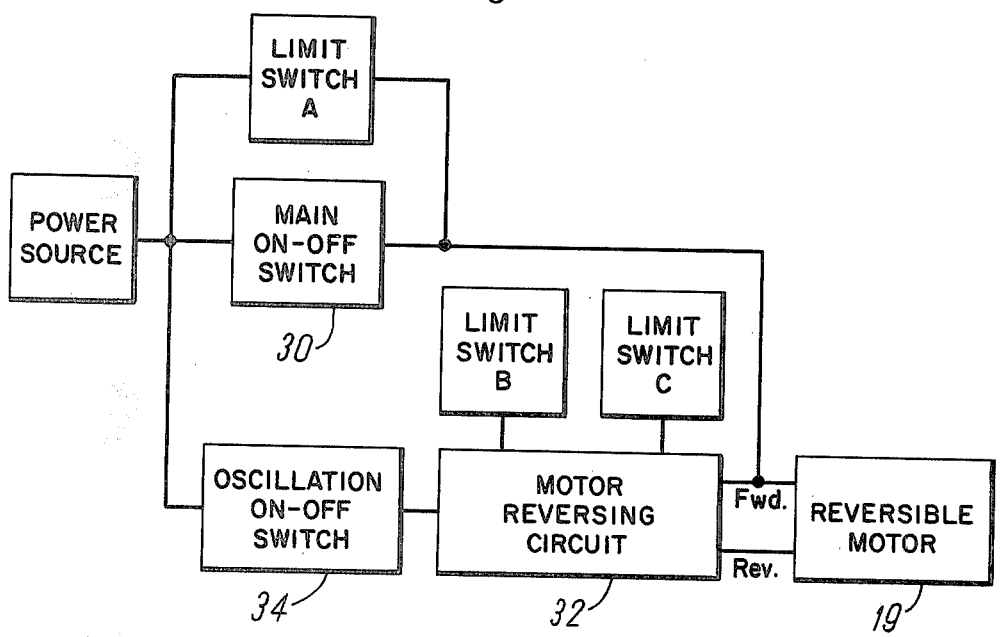
FIG. 4 is a circuit diagram of the arrangement employed in said alternative embodiment.

In the case of horizontally arranged tanks an embodiment of the invention may prove advantageous in which the agitator wings are arranged along the agitator axis offset by 180° relative to each other so that in the switched off condition, one group of agitator wings extends vertically downward, the other group vertically upward. In this position, the first group is most often surrounded by a less dense material and the other group of agitator wings by a denser material, i.e. the agitator wings extending downwards, for example, are surrounded by the juice, and the agitator wings extending upwards by the rape cake floating on the juice so that it will always be only one group of the agitator wings which is subjected to a heavy load. While the tank is being discharged, one group extends upwards into the free space of the tank whereas the other group of the agitator wings is surrounded by the probably solidly conglomerated rape. This embodiment is shown in FIG. 3 wherein the agitator wings 14 are divided into two groups 14a and 14b which are offset 180° relative to each other. A normally closed limit switch A is positioned so that it is engaged by one of the wings 14a or 14b when the wing extends vertically downwardly. As shown in FIG. 4, the limit switch A is connected in parallel with the main on-off switch 30 which controls the motor 19 so that the motor can only be switched off when one of the wings 14a or 14b is in a vertically downward position.

In that embodiment of the invention in which the duration of the oscillating motion is independent of the resistance by the rape, the amplitude of the osciallation, i.e. the swivel angle defined by the agitator wings in the oscillating motion, can be adjusted by means of limit switches which, for example, are actuated by switch elements rotating with the agitator shaft and which, upon actuation reverse the drive of the agitator. Thus, as shown in FIG. 3 a pair of limit switches B and C are positioned at desired points along the arc of movement of the wings 14a and 14b to control the amplitude of oscillation thereof. The limit switches B and C are employed to control a suitable motor reversing circuit 32 (FIG. 4), to which power is supplied through the oscillation on-off switch 34, so that the direction of the motor 19 is reversed each time the wing 14a engages either the limit switch B or the limit switch C.

Also in the case of embodiments where the amplitude of the oscillation is controlled by the resistance of the rape, the maximum amplitude of the oscillation can be adjusted by limit switches.

I claim:

1. An apparatus for agitating the contents of a horizontally arranged large fermentation tank for grape mash, comprising in combination:
   an agitator for the contents of said tank comprising a horizontal shaft positioned within said tank and a plurality of radially extending agitator wings connected to said shaft,
   a drive motor for rotating said agitator,
   means for controlling said drive motor so that said agitator is stopped when one of said agitator wings extends vertically downwardly,
   and means for oscillating said agitator wings back and forth through a fixed angle about the vertically downward position thereof thereby to facilitate the breaking up of solid material which remains in the lower portion of said tank after the liquid contents thereof have been removed.

2. The apparatus of claim 1, wherein said agitator wings are arranged along the axis of said shaft in two groups which are offset 180° relative to each other.

3. The apparatus of claim 1, which includes a discharged opening in the bottom of said tank at an end thereof, and a rotary screw conveyor positioned at the bottom of said tank for conveying solid material which has collected in said tank out through said discharge opening, said oscillating means operating to break loose compacted material above said screw conveyor so that it falls downwardly into said conveyor and is carried out of said discharge opening.

* * * * *